Sept. 20, 1938.  J. OKILL  2,130,649
APPARATUS FOR MEASURING FLUID PRESSURE
Filed Jan. 14, 1937  2 Sheets-Sheet 1

Inventor
John Okill
By [signature]
Atty

Sept. 20, 1938.   J. OKILL   2,130,649
APPARATUS FOR MEASURING FLUID PRESSURE
Filed Jan. 14, 1937   2 Sheets-Sheet 2
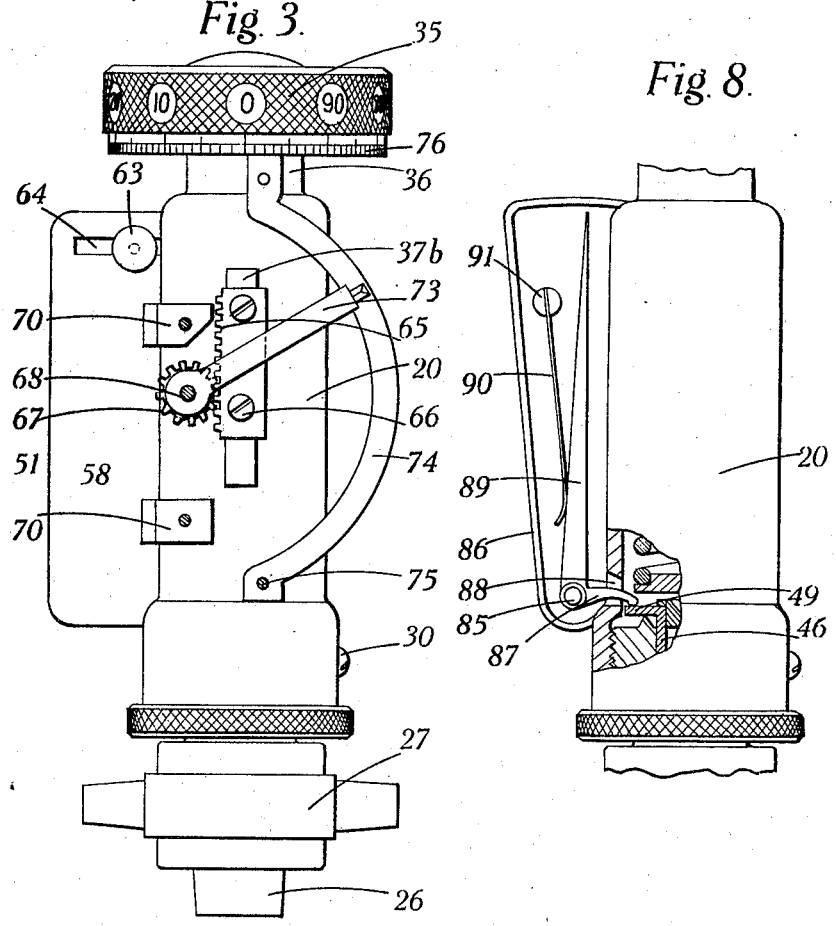

Patented Sept. 20, 1938

2,130,649

UNITED STATES PATENT OFFICE 2,130,649

APPARATUS FOR MEASURING FLUID PRESSURE

John Okill, Lower Bebington, England

Application January 14, 1937, Serial No. 120,572
In Great Britain January 23, 1936

9 Claims. (Cl. 73—111)

This invention is for apparatus for measuring and indicating fluid pressures and whilst applicable for measuring a stated pressure is specially applicable for measuring maximum pressures obtained in cycles of pressure variation, such for example as occur in the cylinders of internal combustion engines. The type of indicator with which the present invention is concerned is that which comprises a piston working in a cylinder and adapted to be subjected to the pressure to be measured, said pressure tending to move the piston in one direction; when a measurement of the pressure is made a counter-balancing force is applied to the piston, which force is adjusted until the piston just floats between two stops which permit slight movement only, or moves from one stop to the other on a small difference between the opposing forces; when the pressure to be measured varies cyclically the piston vibrates cyclically until the counter-balancing pressure just equals the maximum; and means are provided to indicate the magnitude of the counter-balancing force which is a measure of the fluid pressure; and usually a tell-tale device is provided for indicating movement of the piston.

Apparatus for measuring and indicating fluid pressures of the type above set forth is described in the specifications to Letters Patent Nos. 1,467,558 and 1,904,747, granted to me, in which a spring through which the counter-balancing force is applied to the piston, is rotated by a turning moment applied to one end; this tends to turn this end of the spring relatively to the other end; a hand wheel by which the spring is adjusted moves axially and this necessitates the use of a short tell-tale finger and a relatively complicated gear train for operating the device by which the counter-balancing force is measured; moreover the spring in the said construction is long and comparatively heavy and the object of the present invention is to improve gauges of this type by applying the counter-balancing force to the piston through a comparatively short and light spring, in such a manner that said spring is not twisted and preferably in such manner that there is no axial movement of the hand wheel by which said spring is adjusted whereby a counter to measure the spring pressure may conveniently be geared to the hand wheel and a relatively long tell-tale finger be used. The counter-balancing force is applied through a non-rotatable axially adjustable pressure block the axial movement of which compresses the spring, and may also be used to operate a pressure measuring device.

The invention will be described with reference to the accompanying drawings which show examples of a pressure measuring and indicating apparatus of the type above set forth incorporating the improvements according to the present invention.

Figure 1:
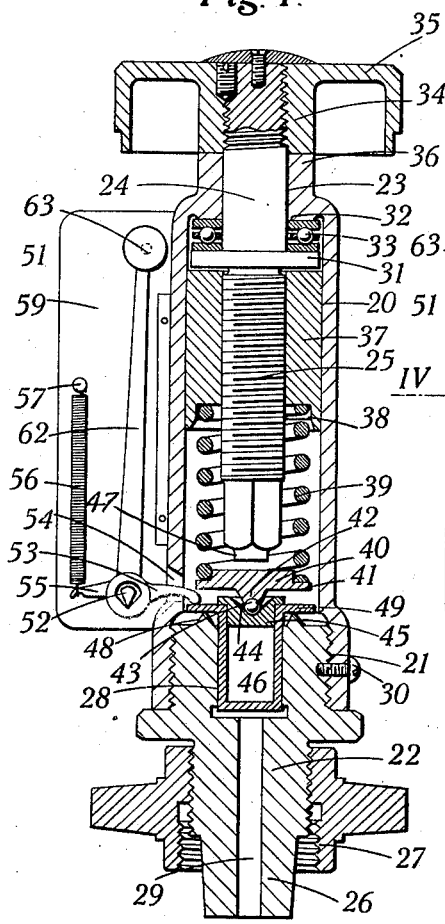
Figure 1 is a sectional elevation on the line I—I of Figure 4.
Figure 2:
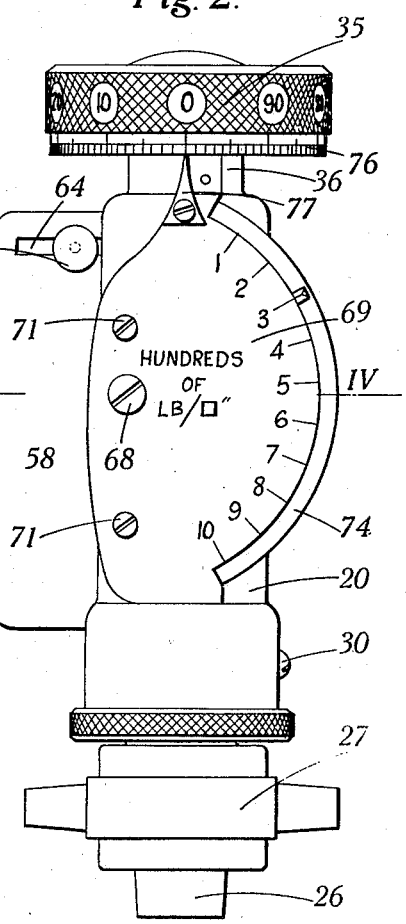
Figure 2 is a front elevation.
Figure 4:
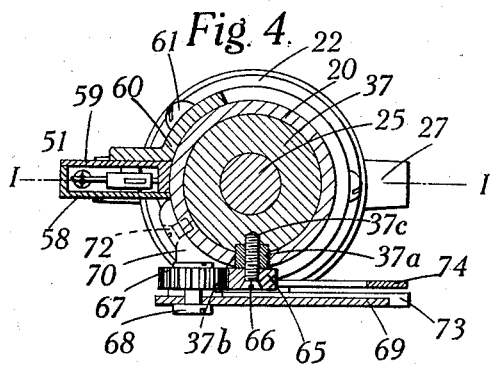
Figure 5:
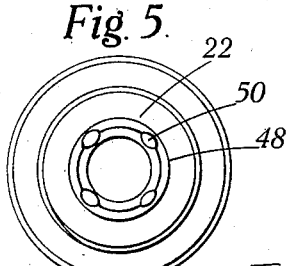

Figure 3 is a front elevation similar to Figure 2 with the pressure indicating scale removed, Figure 4 is a transverse cross section on the line IV—IV of Figure 2, Figure 5 is a detail plan view of a spigot member, Figure 6 is a fragmentary side elevation partly in section of a modified pressure-measuring device, Figure 7 is a front elevation of the apparatus shown in Figure 6, and Figure 8 is a fragmentary front elevation of the pressure indicator fitted with an alternative form of tell-tale device.

Referring to Figures 1 to 5 inclusive, the pressure indicator comprises a casing 20, the lower part of which is screw threaded at 21 to receive a spigot member 22, and the upper part of which is bored at 23 to receive a spindle 24 which is an extension of a traversing screw 25. The lower end spigot member 22 is screw threaded to fit an indicator cock, or so that it may replace a sparking plug, and is usually fitted with a coupling union 27, and the upper end of the member 22 has a cylindrical bore 28 which, when the indicator is in use, communicates through the passage 29 with the interior of the cylinder, the pressure in which is to be indicated. The upper part of the spigot member is externally screw-threaded to take the internally screw-threaded socket 21 of the casing in which it is locked by means of a locating screw 30. The traversing screw 25 is held against axial movement by a collar 31 which bears on an internal boss 32 formed on the upper part of the casing, through a ball thrust bearing 33, and by an internal boss 34 formed on a hand wheel 35 fixed to the spindle 24, the boss 34 bearing on a boss 36 on the upper part of the casing 20. The traversing screw 25 is threaded through a pressure block 37 slidable vertically in the casing 20 and (see Figure 4) held against rotation therein by a key 37a working in a keyway 37b and fixed to the pressure block by screws 37c. The pressure block is recessed at 38 to accommodate a comparatively short pressure measuring spring 39, the lower part of which grips a boss 40 on a centralizing member 41 having a conical extension 42 fitted with a steel ball 43 which bears on a conical seating 44 in a block 45 secured in a hollow piston 46 which works in the cylindrical bore 28. The centralizing member ensures an axial application of the spring load on the piston and the non-rotatable pressure block compresses the comparatively short spring without twisting or flexing it, thus ensuring accuracy in the instrument. The upward movement of the piston 46 under the action of the pressure in the cylinder 28 is limited by an axially located stop 47 formed as an extension of the traversing screw 25 and downward movement of the piston is limited by a crown 48 formed on the upper part of the spigot member 22, a flange 49 on the piston resting on the crown when the piston is in its lowermost position. Lubricating oil from between the piston and cylinder walls tends to discharge under the flange 49 and the crown 48 is provided with channels 50 as shown in Figure 5 which prevent the formation of a film of oil under the flange 49 which would tend to cause sticking of the piston, and thereby inaccuracy in the instrument.

The movement of the piston which takes place when the pressure applied thereto by the spring is approximately equal to the pressure to be measured, as hereinafter described, is transmitted to and indicated by a tell-tale device 51 which comprises a lever pivoted on a knife edge 52 and having an arm 53 which projects through an aperture 54 in the casing 20 and bears on the flange 49 of the piston, and an arm 55 connected to a tension spring 56 anchored at 57 to the casing of the tell-tale device which casing comprises a tray-like front plate 58 secured to a back plate 59 mounted on a bracket 60 secured by screws 61 (one only of which is shown) to the casing 20. In addition to the arms 53 and 55 the lever is provided with a long arm 62 located within the casing and terminating in a polished button 63 located in front of the casing, which latter is preferably of a dull colour to contrast with the button; the button has a short stem which projects through a slot 64 in the front plate 58 of the casing and is connected to the upper extremity of the lever 62.

In order to measure the amount of pressure applied by the spring 39 to the piston 46 and thereby the pressure in the cylinder or the like to which the indicator is connected, means are provided for measuring the amount of compression of the spring. One example of means for measuring the amount of compression of the spring is shown in Figures 2, 3 and 4, and comprises a rack 65 connected to the key 37a by means of screws 66 and meshing with a pinion 67 journalled on a stud 68 carried by a protecting face plate or scale 69. The face plate 69 is secured to brackets 70 by means of screws 71, the brackets 70 being secured to the casing 20 by means of screws 72 one only of which is shown in Figure 4. The pinion 67 has rigidly secured to it an indicating pointer 73 the tip of which projects outwards and works over a circular scale inscribed on the circumferential portion of the front plate 69, the pointer working between the front protecting plate 69 and an arcuate guard plate 74 spaced from and secured to the front plate by screws 75. Preferably the scale is graduated in multiple units such as hundreds of pounds per square inch, and the hand wheel 35 is provided with a circumferential scale 76, associated with a fixed pointer 77 secured to the face plate 69 and the scale 76 may be graduated in units and tens of units, fractions of units being obtainable by observation. In the example shown the scale on the face plate is graduated in hundreds of pounds and the scale 76 in units of one pound up to 100 pounds, multiples of 10 pounds being indicated by figures inscribed on the circumferential face of the hand wheel; the thread of the traversing screw has a pitch such that one complete revolution of the hand wheel changes the pressure on the spring by 100 pounds.

In using the instrument it is connected to the cylinder, the pressure in which is to be measured, by means of the spigot member 22 and coupling 27, and the hand wheel is adjusted until the pressure applied by the spring on the piston is such that the slightest variation of pressure causes the piston 46 to rise or fall; the reading given by the scale on the face plate 69 and the scale 76 is then equal to the pressure to be measured. The movement of the piston is as stated indicated by the tell-tale device 51 and in applying the indicator to the measurement of the pressure in the cylinder of for example an internal combustion engine, the button 63 will until the spring pressure balances the maximum pressure on the piston, oscillate from side to side due to the fluctuations in pressure for successive strokes and this movement of the button will be clearly indicated due to the polished surface thereof contrasting with the dull surface of the front plate 58.

The modified form of pressure measuring device shown in Figures 6 and 7 comprises a toothed annulus 78 secured to the hand wheel 35 and meshing with a pinion 79 coupled by a sleeve 80 to the operating spindle 81 of a cyclometer type of counter 82 attached to the casing 20 by means of a saddle piece 83 and screws 84. Each revolution and fractions of a revolution of the hand wheel are indicated by the counter 82 which thereby gives a direct reading of the pressure applied through the spring 39; for example each one hundredth part of a revolution of the hand wheel may be arranged to cause a change of pressure of one pound on the piston and each one hundredth part of a revolution of the hand wheel will therefore rotate the pinion and counter spindle so as to cause a change of one unit in the counter 82, the reading or difference between two readings of which gives the pressure on the piston.

A modified form of tell-tale is shown in Figure 8 and comprises a lever pivoted at 85 to a casing 86 and having a short arm 87 which projects through a slot 88 in the casing 20 and into engagement with the flange 49 on the piston 46. The lever has a long arm or pointer 89 which is oscillated by movement of the piston 46, the movement of the pointer being governed by a flat spring 90 carried by a pillar 91 fixed to the casing 86. As the hand wheel 35 does not move downwardly the tell-tale pointer can be made the full length of the casing 20 so that a very small movement of the piston between its stops is clearly indicated by the end of the tell-tale pointer.

The arrangement described by way of example, provides a compact and accurate instrument, which can be inexpensively machined and assembled, the arrangement of the non-rotatable spring and pressure block, permitting the use of a traversing screw of comparatively small diameter with a corresponding reduction of friction, and a short light spring free from objectionable stresses and a long tell-tale pointer; whilst the utilization of the axial movement of the compression block and the angular movement of the head to give co-ordinated means for measuring the spring pressure, provides a very accurate and conveniently housed indicating means.

Modifications may be made in the example above set forth without departing from the nature of the invention; for example instead of arranging the circumferential scale 76 on the hand wheel it may be arranged on the upper part of the casing and may co-operate with a pointer fixed to the hand wheel. The details of construction may be varied in accordance with the duties of the instrument, the degree of accuracy required and the range of pressures which have to be measured, and the invention is applicable not only to single plain piston instruments but also with suitable modifications to differential piston arrangements.

I claim:

1. In apparatus for measuring fluid pressure the combination with, a cylinder subject to the pressure to be measured, a piston moving in said cylinder between limit stops, a tell-tale device actuated by the piston, a pressure transmitting member, a spring interposed between the piston and said member, a traversing screw engaging a screw-threaded part of the said member, and means for indicating the extent of movement of the said member; of a casing attached to the cylinder and having a bore in which the said member is guided longitudinally of the cylinder, means by which the said member is held against rotation relatively to the casing, a thrust and journal bearing in the top of the casing by which the traversing screw is rotatably mounted and held against axial movement, and means external to the casing connected to the traversing screw by which the latter can be rotated by hand.

2. Apparatus as claimed in claim 1, in which the cylinder and the opening leading to it are formed in a screwed union to which the casing is attached; and in which the piston is of tubular configuration closed at the lower end and having an external flange at the upper open end which by engagement with an interrupted annular projection on the face of the union limits the downward movement of the piston.

3. The combination with apparatus as claimed in claim 1 of a spring-cap fitting the end of the spring nearest the piston and adapted to take the thrust thereof, and having a cone-shaped projection on the side remote from the spring, and a piston-cap fitting the piston and adapted to transmit the thrust of the spring to the piston, said piston cap having a conical recess to take the conical projection on the spring-cap and to maintain the axial alignment of the spring.

4. The combination with apparatus as claimed in claim 1, of a piston cap having a coned recess, a spring-cap having a coned extension the apex angle of which is less than that of the said coned recess, and the apex end of which is concave, and a ball at the bottom of the said recess with which the concave apex of the spring cap engages.

5. Apparatus as claimed in claim 1, in which the casing has a longitudinal slot, and the pressure transmitting member has a key fixed to it; and in which the indicating means comprise a rack fixed to the said key, a pivoted pointer, a graduated scale plate for the pointer and a pinion on the pointer pivot gearing with the rack.

6. Apparatus as claimed in claim 1, in which the casing has a longitudinal slot, and the pressure transmitting member has a fixed key slidable in said slot; and in which the indicating means comprise a rack fixed to the said key, a pivoted pointer, a scale plate in front of the pointer, a pinion engaged with said rack, and by which the pointer pivot is actuated, a guard plate behind the pointer carried by the scale plate, and means for attaching the scale plate to the casing, and in which the tell-tale device is a pivoted lever with a long arm and a short arm engaging the piston; a spring connecting an arm of the lever to a fixed point, a signal part attached to said long arm by a stem and a housing for the lever the front plate of which forms a back plate for the signal part and is slotted to permit the passage therethrough and the free movement of the stem.

7. Apparatus as claimed in claim 1, wherein the tell-tale device comprises in combination, a pivoted lever having a long arm and a short arm, a spring connected to a fixed point and maintaining the end of the short arm in contact with the piston, a signal part, a stem connecting said signal part to the end of the long arm of the lever, a casing in which the lever is housed, one side of which casing forms a back plate behind the signal and having a slot through which the stem connecting the housed lever to the signal passes freely, the respective surfaces of the back plate and the signal being in marked contrast.

8. In apparatus for measuring fluid pressure, the combination with a cylinder subject to the pressure to be measured, a piston moving in said cylinder between limit stops, a tell-tale device actuated by the piston, a pressure transmitting member, a spring interposed between the piston and said member and a traversing screw engaging a screw threaded part of said member, of a casing attached to the cylinder and having a bore in which said member is guided longitudinally of the cylinder, means by which said member is held against rotation relatively to the casing, a thrust and journal bearing in the top of the casing by which the traversing screw is rotatably mounted and held against axial movement, means external to the casing and connected to the traversing screw by which the latter can be rotated by hand, a pivoted pointer moving over a scale graduated in pressure units, a toothed wheel on the pointer spindle, and a longitudinally disposed rack attached to the pressure transmitting member for movement therewith and gearing with said toothed wheel.

9. In an apparatus for measuring fluid pressure, the combination with a cylinder subject to the pressure to be measured, a piston moving in said cylinder between limit stops, a tell-tale device actuated by the piston, a pressure transmitting member, a spring interposed between the piston and said member, and a traversing screw engaging a screw threaded part of said member, of a casing attached to the cylinder and having a bore in which the said member is guided longitudinally of the cylinder, means by which the said member is held against rotation relatively to the casing, a thrust and journal bearing in the top of the casing by which the traversing screw is rotatably mounted and held against axial movement, means external to the casing and connected to the traversing screw by which the latter can be rotated by hand, a pivoted pointer moving over a scale graduated in pressure units, a toothed wheel on the pointer spindle, a longitudinally disposed rack attached to the pressure transmitting member for movement therewith and gearing with said toothed wheel, whereby when the pressure transmitting member is moved to change the pressure transmitted by the spring to the piston, by a given number of pressure units, said toothed wheel is rotated by an amount necessary to change the scale reading by the same number of units, an external sleeve fixed to the traversing screw which in one revolution moves the pressure transmitting member longitudinally by an amount which changes the pressure transmitted by the spring to the piston by a given number of units, a fixed pointer and a circumferential scale, one of which is fixed on the casing and the other on said sleeve, said scale being divided into said given number of scale divisions.

JOHN OKILL.